(12) United States Patent
do Amaral Assy

(10) Patent No.: US 10,231,375 B2
(45) Date of Patent: Mar. 19, 2019

(54) PRECISION SEED-DISPENSING SYSTEM

(71) Applicant: Jose Roberto do Amaral Assy, Município de Caldas Novas (BR)

(72) Inventor: Jose Roberto do Amaral Assy, Município de Caldas Novas (BR)

(73) Assignee: Jose Roberto do Amaral Assy, Caldas Novas (BR)

( * ) Notice: Subject to any disclaimer, the term of this patent is extended or adjusted under 35 U.S.C. 154(b) by 0 days.

(21) Appl. No.: 15/311,634

(22) PCT Filed: Apr. 27, 2015

(86) PCT No.: PCT/BR2015/000057
§ 371 (c)(1),
(2) Date: Nov. 16, 2016

(87) PCT Pub. No.: WO2015/172213
PCT Pub. Date: Nov. 19, 2015

(65) Prior Publication Data
US 2017/0094891 A1    Apr. 6, 2017

(30) Foreign Application Priority Data

May 16, 2014    (BR) .............................. 102014011794

(51) Int. Cl.
*A01B 79/00*    (2006.01)
*A01C 5/06*    (2006.01)
(Continued)

(52) U.S. Cl.
CPC ............ *A01B 79/005* (2013.01); *A01C 5/064* (2013.01); *A01C 7/04* (2013.01); *A01C 7/046* (2013.01);
(Continued)

(58) Field of Classification Search
CPC ........... A01C 5/064; A01C 5/062; A01C 5/06; A01C 5/00; A01C 7/046; A01C 7/044;
(Continued)

(56) References Cited

U.S. PATENT DOCUMENTS 3,632,918 A * 1/1972 Anson ...................... H01H 1/26
                                                                    200/61.41
4,448,259 A   5/1984 Ford et al.
(Continued)

FOREIGN PATENT DOCUMENTS

AU    4624885 A    2/1986
BR    PI1000054 A1    3/2011
(Continued)

OTHER PUBLICATIONS

PCT International Search Report, PCT/BR2015/000057, dated Jun. 10, 2015, with English Translation.
(Continued)

*Primary Examiner* — Christopher J. Novosad
(74) *Attorney, Agent, or Firm* — FisherBroyles, LLP

(57) ABSTRACT

A precision seed-dispensing system of the type applied on planters with a machine element that touches the soil and having a chassis that supports the seed meter. In accordance with the system disclosed herein, it may also have a damper system between the machine element that touches the soil and the seed meter, irrespective of the model or its shape.

5 Claims, 11 Drawing Sheets

(51) Int. Cl.
*A01C 7/04* (2006.01)
*A01C 7/20* (2006.01)

(52) U.S. Cl.
CPC .............. *A01C 7/201* (2013.01); *A01C 7/203* (2013.01); *A01C 7/206* (2013.01)

(58) Field of Classification Search
CPC .. A01C 7/042; A01C 7/04; A01C 7/00; A01C 7/203; A01C 7/201; A01C 7/20; A01C 7/206; A01B 79/005; A01B 79/00
See application file for complete search history.

(56) References Cited

U.S. PATENT DOCUMENTS

| | | | | |
|---|---|---|---|---|
| 4,570,615 | A | * | 2/1986 | Barkalow ............ A61H 31/006 601/106 |
| 5,158,411 | A | * | 10/1992 | Kemmner ................ A01C 5/06 111/131 |
| 6,520,100 | B1 | * | 2/2003 | Spooner, Sr. .......... A01C 7/102 111/52 |
| 7,401,561 | B1 | | 7/2008 | Kurz |
| 7,426,893 | B2 | | 9/2008 | Wendte et al. |
| 7,549,383 | B2 | | 6/2009 | Sauder et al. |
| 2006/0213407 | A1 | | 9/2006 | Sauder et al. |
| 2010/0300342 | A1 | * | 12/2010 | Peterson ................ A01C 7/046 111/200 |

FOREIGN PATENT DOCUMENTS

| | | | | |
|---|---|---|---|---|
| WO | WO-2009043853 | A1 | * 4/2009 | ............. A01C 7/046 |
| WO | 2013116912 | A1 | 8/2015 | |
| WO | 2015172213 | A1 | 11/2015 | |

OTHER PUBLICATIONS

PCT Written Opinion, PCT/BR2015/000057, dated Jun. 10, 2015, with English Translation.
PCT Informal Communication Pursuant to Article 19.1 of the PCT for PCT/BR2015/000057, dated Sep. 1, 2015.

* cited by examiner

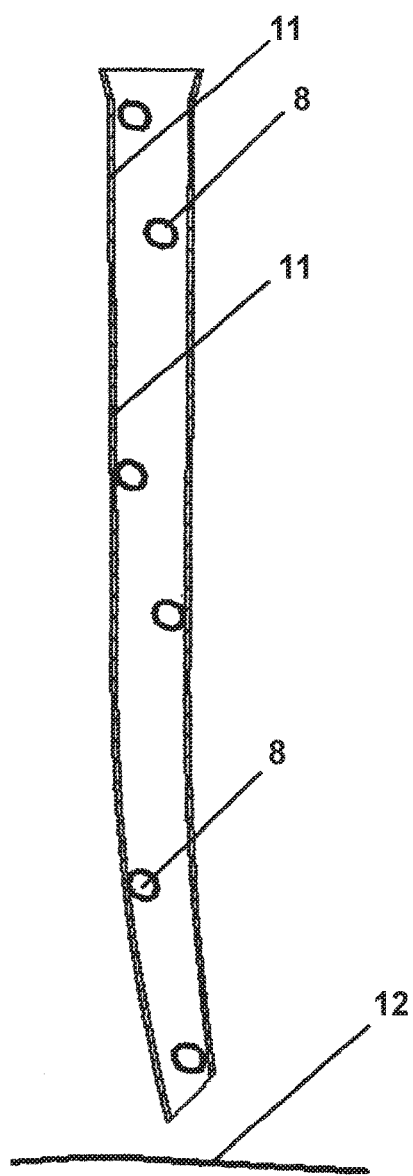
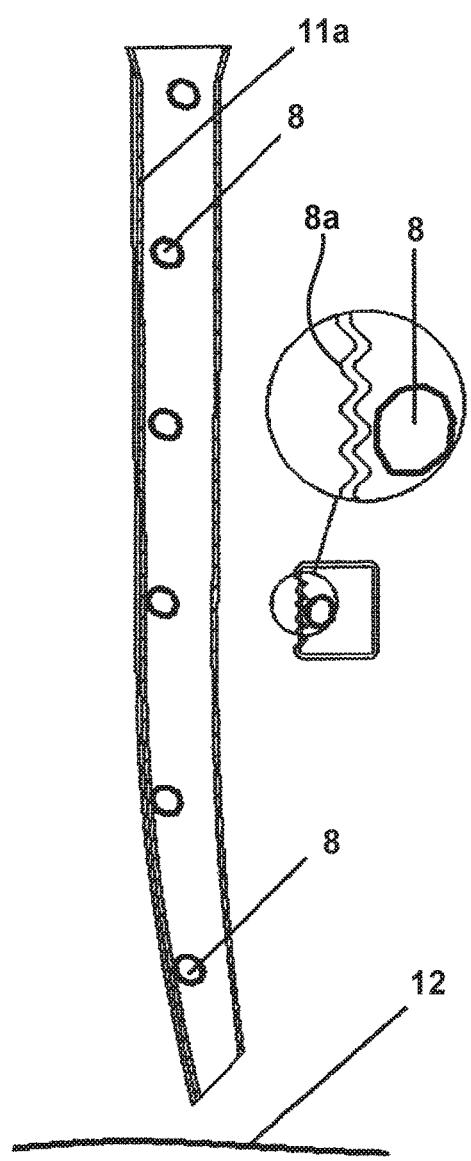
FIG. 8
(PRIOR ART)
FIG. 9

FIG. 15
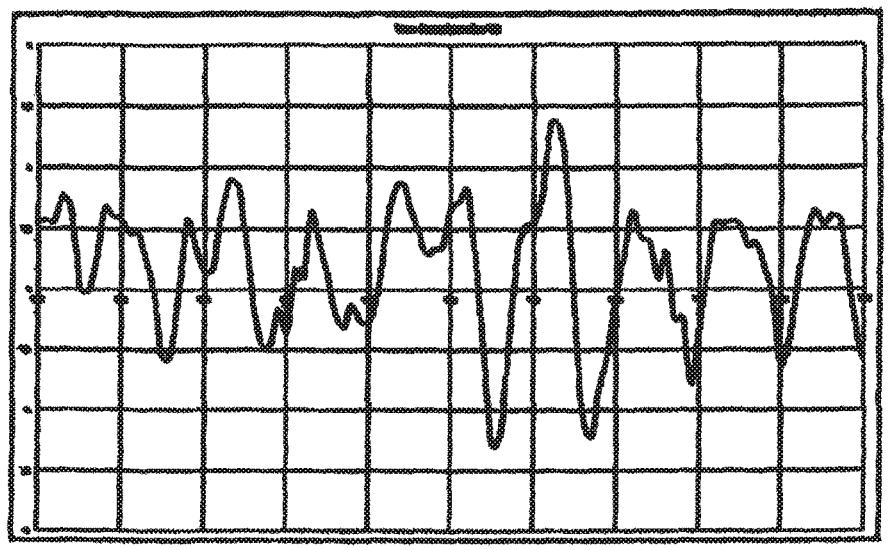
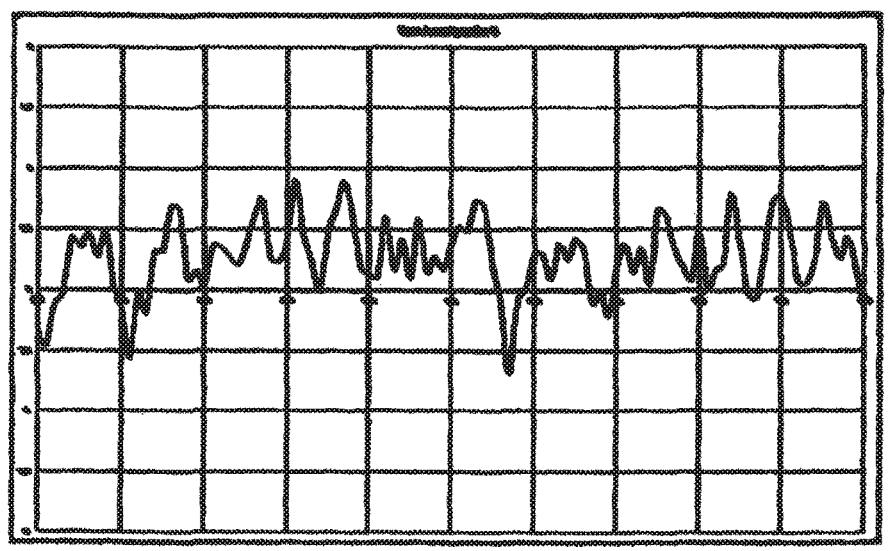
FIG. 16
(PRIOR ART)

PRECISION SEED-DISPENSING SYSTEM

CROSS-REFERENCE TO RELATED APPLICATIONS

This application is a national phase entry under 35 U.S.C. § 371 of International Patent Application PCT/BR2015/000057, filed Apr. 27, 2015, designating the United States of America and published as International Patent Publication WO 2015/172213 A1 on Nov. 19, 2015, which claims the benefit under Article 8 of the Patent Cooperation Treaty to Brazilian Patent Application Serial No. BR102014011794.6, filed May 16, 2014. The entire disclosure of each of the foregoing documents is hereby incorporated herein by this reference.

TECHNICAL FIELD

The disclosure is related to a planting machine that has a planting system that distributes seeds on the soil.

BACKGROUND

As is known by persons skilled in the art, the distribution of seeds into furrows is extremely beneficial as there is a correlation between the distribution of the seeds and the productivity of the crops that are normally planted.

Various inventors and companies have been investing resources in a search for innovative products and for a way that will provide better distribution of seeds in planting furrows.

Various types of seed meters are known in the art, including the horizontal disc type, the pneumatic type and the finger seed meters, among others. The purpose of all of them is to distribute seeds at regular intervals so that they enter the planting furrows at a predetermined spacing so that crops can be grown in a regular way.

Normally, based on the known prior art, these seed meters are above the level of the soil and the seeds get to the soil by falling down due to the force of gravity, through a conductor of the seed distribution machines, which may be curved backward, permitting the seeds to fall into the planting furrows. This system also avoids setbacks taking place in the longitudinal distribution into the planting furrows.

In recent times, JOHN DEERE® filed a patent application PI1000054-2 that shows a distribution system of seeds that removes the seed from the seed meter by taking a seed from the seed meter and moving it in a downward direction to a release point. The seed is dropped at a high speed backward in a horizontal direction, which is approximately equal to the speed and movement in a forward direction of a planting machine. This is done in such a way that, when it is offloaded, it has a low or zero horizontal speed relative to the soil. Rolling of the seed in the soil is reduced due to the horizontal speed being close to zero in relation to the soil. Therefore, the combination of the fall and the controlled offloading at a horizontal speed that is substantially zero in relation to the soil, reduces the variability in the seed spaces.

In spite of the benefits and the use of the aforementioned patent being deemed as satisfactory, the results are not so satisfactory when the equipment is used in rugged micro reliefs. It is known that these micro reliefs are detected by the planting machines that have to deal with these oscillations, which are then passed to the seed meter, which, in turn, transfers the seeds. As a result, it loses, at least in part, the effect that was desired by the above solution.

It is worth reiterating that the planting machines of the prior art have a depth-limiting wheel that is in contact with the soil. As its name suggests, it limits the depth of the furrows with the disc cutters. These discs cut into the soil creating furrows for the seeds to be placed in. It is known that the soil is irregular and uneven on its surface and this was particularly noted in the planting systems known as "direct planting" or "direct planting in straw." In these cultivation systems, there is no soil plowing nor harrowing; it is simply planted over the remains of previously planted plants. The irregularities in the soil surface or irregularities of micro terrains are especially high in relation to traditional planting systems that use the plough and the harrow to obtain uniformity of the soil. For direct planting, there is a lot of evidence for the use of various machines, trackers, planters, harvesters, crop spraying machines, amongst others, which all end up making the land irregular.

BRIEF SUMMARY

Therefore, provided is an accurate seed distribution system that permits the better distribution of seeds on the soil, especially in irregular micro reliefs and where the elements of the planting machine that touches the soil has to cope with these irregularities and transmit them to the seed meter that, in turn, transfers the consequences on to the seeds.

Also provided is a precision seed distribution system that compensates for oscillations on micro reliefs and that does not cause delays or advances in the distribution of the seeds onto the soil. The system should also eliminate undesirable irregularities in the distribution of the seeds on the soil.

It was discovered in the research conducted that these irregularities in the micro reliefs, especially those that cause vertical jerks and bumps on the depth-limiting wheels, have a significant effect on the frequency and quality of the deposition of the seeds in the soil. Any bumps or jerks or high vertical accelerations in a short space of time on the depth-limiting wheels can also provoke the same effect on the seed meter and the seed conductor. This is because the connection between these items for the planting machine is direct, without any dampers, as in the prior art.

Any current or future planting machine will likely always need a machine element for support that is close to the soil. This particular element will need to deal with the consequences of irregular soils and these consequences will be transmitted to the seed meter, irrespective of the model that is used.

Provided is a precision seed distribution system comprising at least one damper system amongst the machine elements that touch the soil and the seed meter, irrespective of the model or its shape.

BRIEF DESCRIPTION OF THE DRAWINGS

What follows is a description of the present system with reference to the accompanying drawings that are annexed to this document, wherein:

FIG. 8 represents a schematic view of the seeds being taken to the soil by a seed conductor of the prior art, where there is no damper system;

FIG. 9 represents a schematic view of the seed being taken to the soil through a seed conductor with the use of a damper system disclosed herein, the grooves provided in the seed conductor being illustrated in detail below;

FIGS. 15 and 16 represent two acceleration graphs, one showing the prior art data and the other showing the data from the disclosure herein.

DETAILED DESCRIPTION

According to these illustrations, the precision seed distribution system is applied on a planting machine of the type that has a machine element (3, 13) (e.g., at least one wheel) that touches the soil and provides the placement of damper systems (2, 4) between the elements (3, 13) that touch the soil and the seed meter (1), irrespective of its type or shape.

Figure 1:
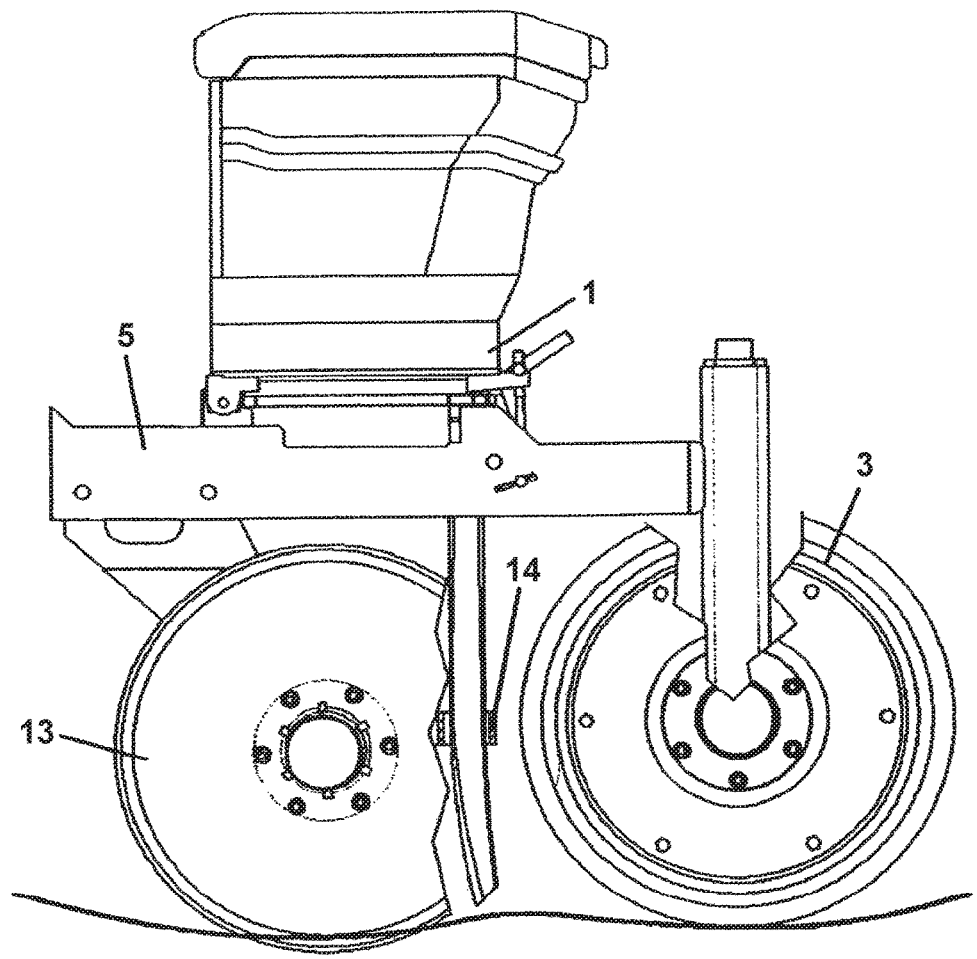
FIG. 1 represents a side view of a prior art planting line, where the depth-limitation wheel, the chassis for the seed meter, the seed meter and the cutting disc can all be seen.

As can be seen in FIG. 1, there is a side view of a typical planting line of the prior art, with depth-limiting wheels (3) connected to the seed meter chassis (5) sustaining the seed meter. One can change the shape or the way it supports itself on the soil. This just represents the current prior art and what can be created for touching the soil.

Figure 6:
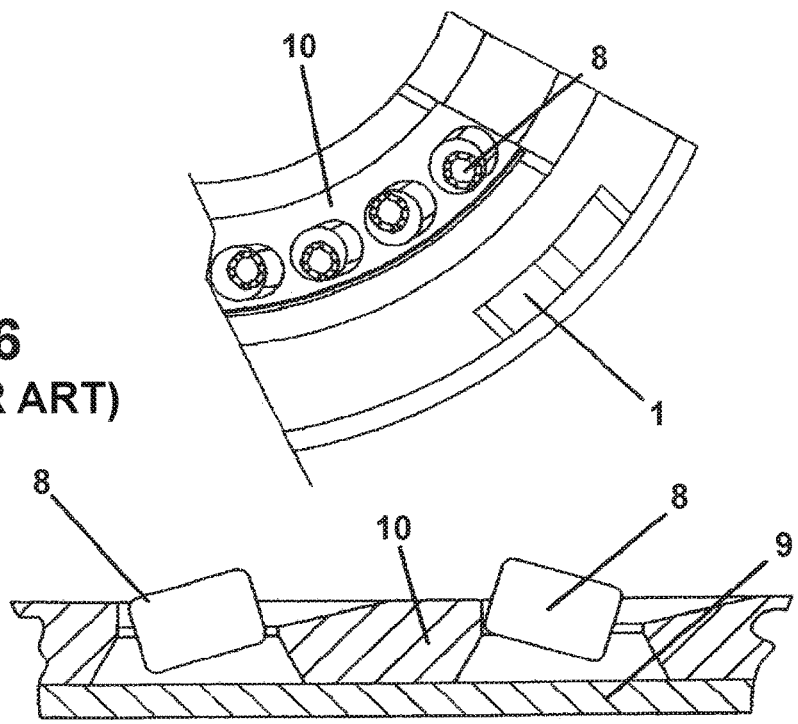
FIG. 6 represents a schematic view of the position of the seeds in relation to the disc and the seed meter ring of the prior art, without the damper system.
Figure 7:
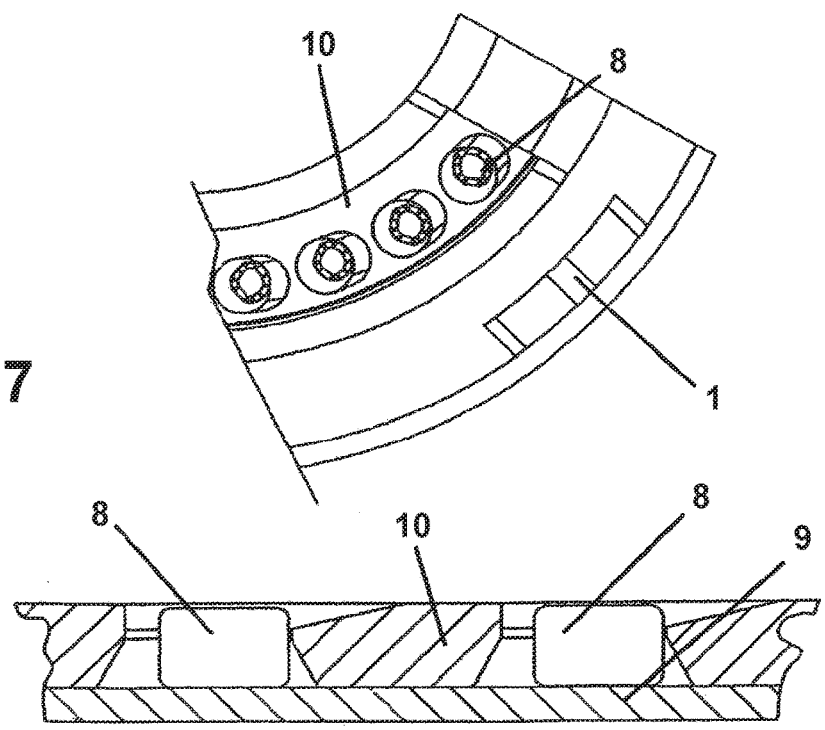
FIG. 7 represents a view of the position of the seeds in relation to the disc and the seed meter ring with the damper system disclosed herein.
Figure 10:
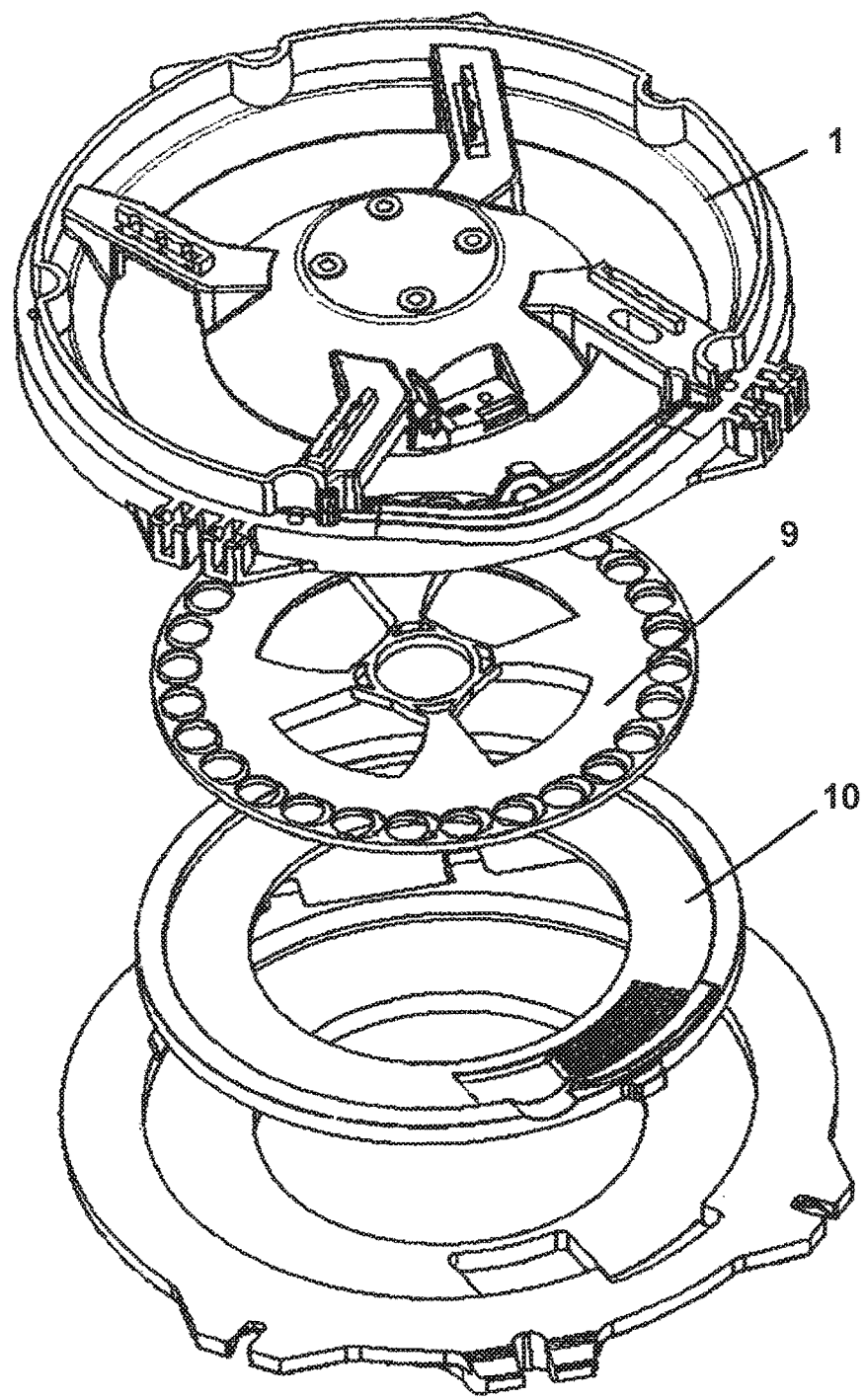
FIG. 10 represents an example of the seed meter with a ring and a seed disc.

Studies that have taken place have shown that these vertical accelerations of jerks and bumps on the depth limitation wheels (3) cause bumps on the seed meter (1) and on its components such as its disc (10) and the planting ring (9) (shown in FIGS. 6, 7, and 10). Therefore, as shown in FIGS. 6, 7, and 10, as the seeds (8) are always supported by the ring (9) (honeycombed-type seed meter) or trapped by the pressure on the disc (10) (pneumatic system) or in any other type of seed meter (1) that is produced, the seeds (8) end up being bumped, which destabilizes the fall of some of the seeds (8) through the seed meter (1) until it reaches the soil (12) (see FIG. 8). This destabilization occurs for both the seed meter (1) and in its outlet and on the path to the soil (12).

Figure 11:
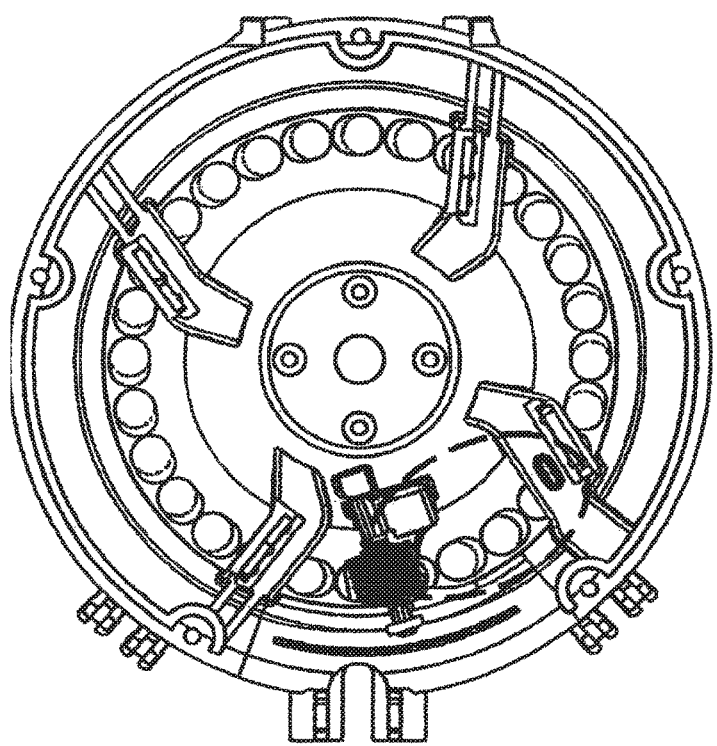
FIGS. 11 and 12 represent a prior art top view of the seed meter and the stabilizing zone for the seeds just prior to the seeds leaving the seed meter and going through the seed conduits to end up on the soil.
Figure 12:
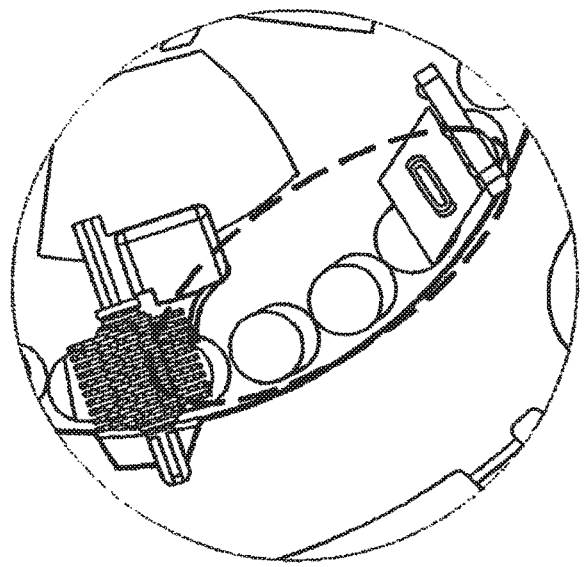

Especially for the seed meters where the seeds slide over a ring, as is the case for process BR1020120028387, it was noted that there was a tremendous amount of stability for the seeds in the so-called "Stabilization Zone" shown in FIGS. 11 and 12. In order to better facilitate the sliding of the seeds over the ring, the ring was designed with grooves in order to reduce the friction between the ring and the seeds.

Figure 2:
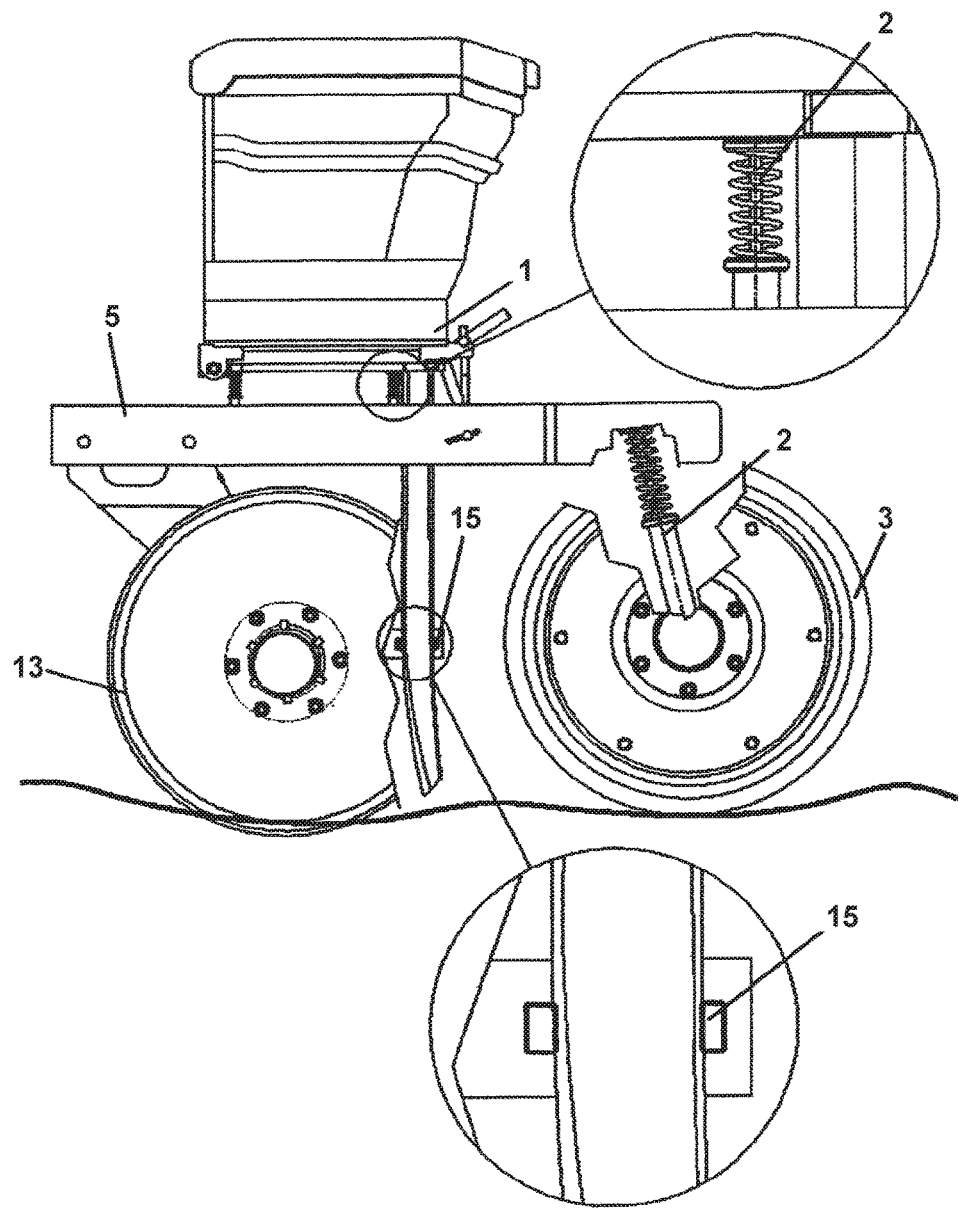
FIG. 2 represents a side view of the planting line with two damper systems. The depth-limitation wheel, the damper system, the chassis for the seed meter, the seed meter and the disc cutters can all be seen.
Figure 5:
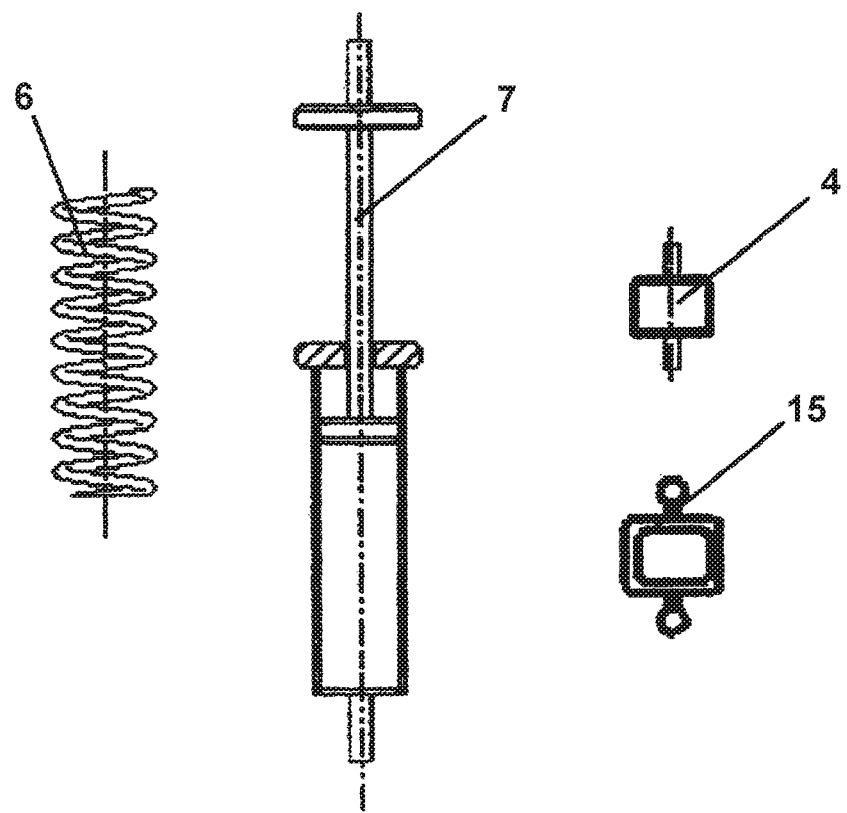
FIG. 5 represents a view of the components for the damper system with pistons and springs.
Figure 13:
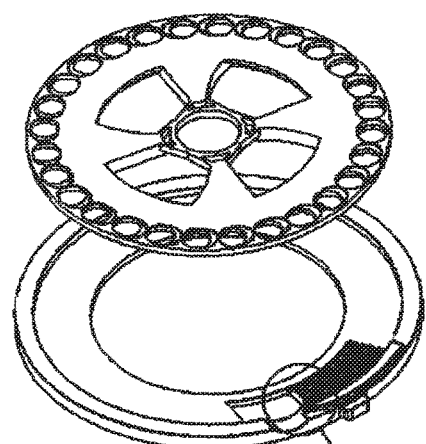
FIG. 13 represents a top view of the ring with grooves that reduce the friction of the ring with the seed.
Figure 14:
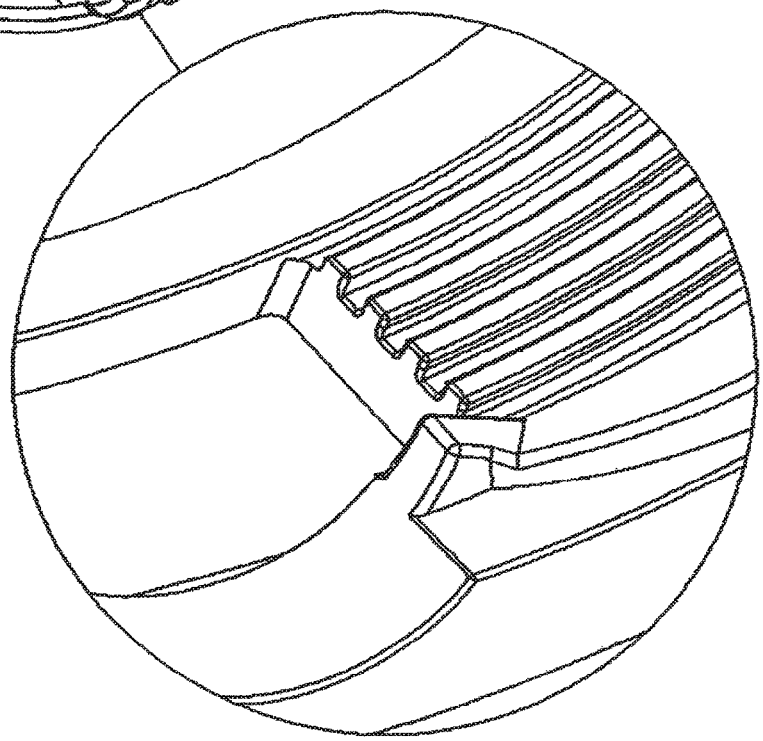
FIG. 14 represents a side view of the ring with grooves.

In addition to the innovative system disclosed herein, a seed conductor was also designed with grooves, but this time they would be vertical, which would minimize friction between the seed and the conductor walls (see FIGS. 13 and 14). This would aid in uniformly stabilizing the fall of the seeds until they reach the soil, with the conductor being in the normal position between the seed meter and the soil as mentioned earlier. Aside from this, the conductor also has a damper system (15) that lessens both the vertical and horizontal vibrations that may affect the structure that sustains it. In particular, as shown in FIGS. 2 and 5, a damper of the elastomer type is used with the conductor, but other damper systems can be used depending upon the shape and availability of the space in each case. The conductor also benefits from the damper system (2) being positioned between the seed meter chassis and the seed meter as the conductor in this case is directly connected to the seed meter.

In FIG. 2, one can see a side view of the planting line that was designed where there is a damper system (2) between the depth-limiting system (3) and the seed meter chassis (5) and the other damper system (2) between the seed meter chassis (5) and the seed meter (1) itself.

With these damper systems, the irregularities of the soil (12) are lessened and the frequency and quality of the seeds (8) falling from the seed meter (1) onto the soil (12) significantly improves. In particular, at the exact moment the seeds (8) are leaving the seed meter (1), bumps and jerks may occur and delay or accelerate the seeds (8), causing irregularities when planting. This is minimized by the damper system disclosed herein.

In field studies, the disclosed system was tested on planting machines, showing that there is a significant difference in the vertical and horizontal acceleration of the seed meter under the effect of the damper system of this disclosure and that of the prior art. As shown in FIGS. 15 and 16, where the graph of FIG. 15 represents the acceleration through time for the damper system of this disclosure, and the graph of FIG. 16 represents the acceleration in time of the seed meter of the prior art. As shown in FIG. 16, the seeds in the prior art system accelerated with more intensity and frequency.

This resulted in a coefficient variation for the deviation in the norm of the seed distribution (8) on the soil (12) from 14% to 7% at a planting speed of 7.2 km/hour, with the use of the damper systems (2) on the soil (12) under direct planting on straw, compared with the prior art.

Figure 3:
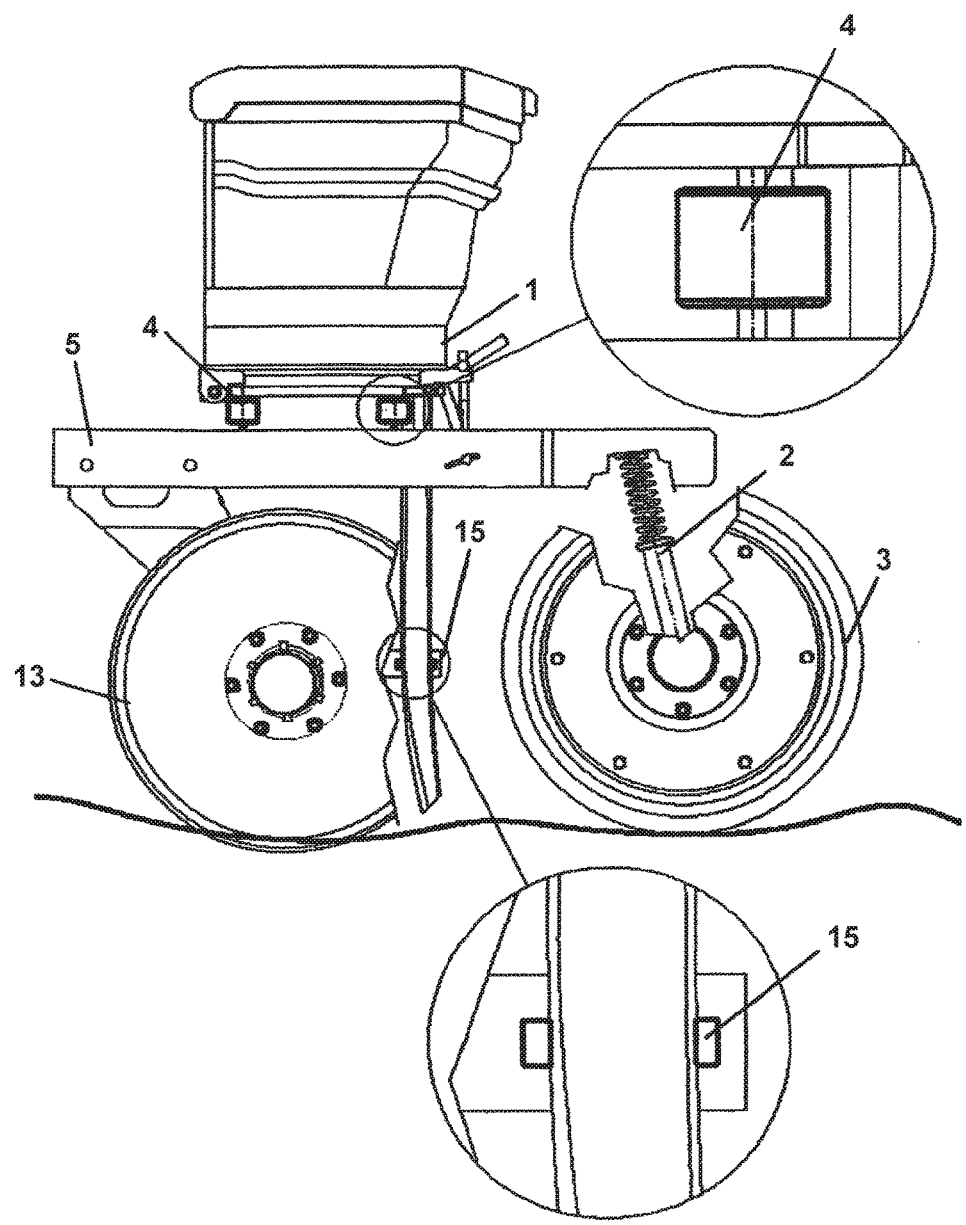
FIG. 3 represents a side view of the planting line with two damper systems, where the depth-limitation wheel, the damper system with springs and pistons, the damper system with plastic material, the chassis for the seed meter, the seed meter and the disc cutters can all be seen.
Figure 4:
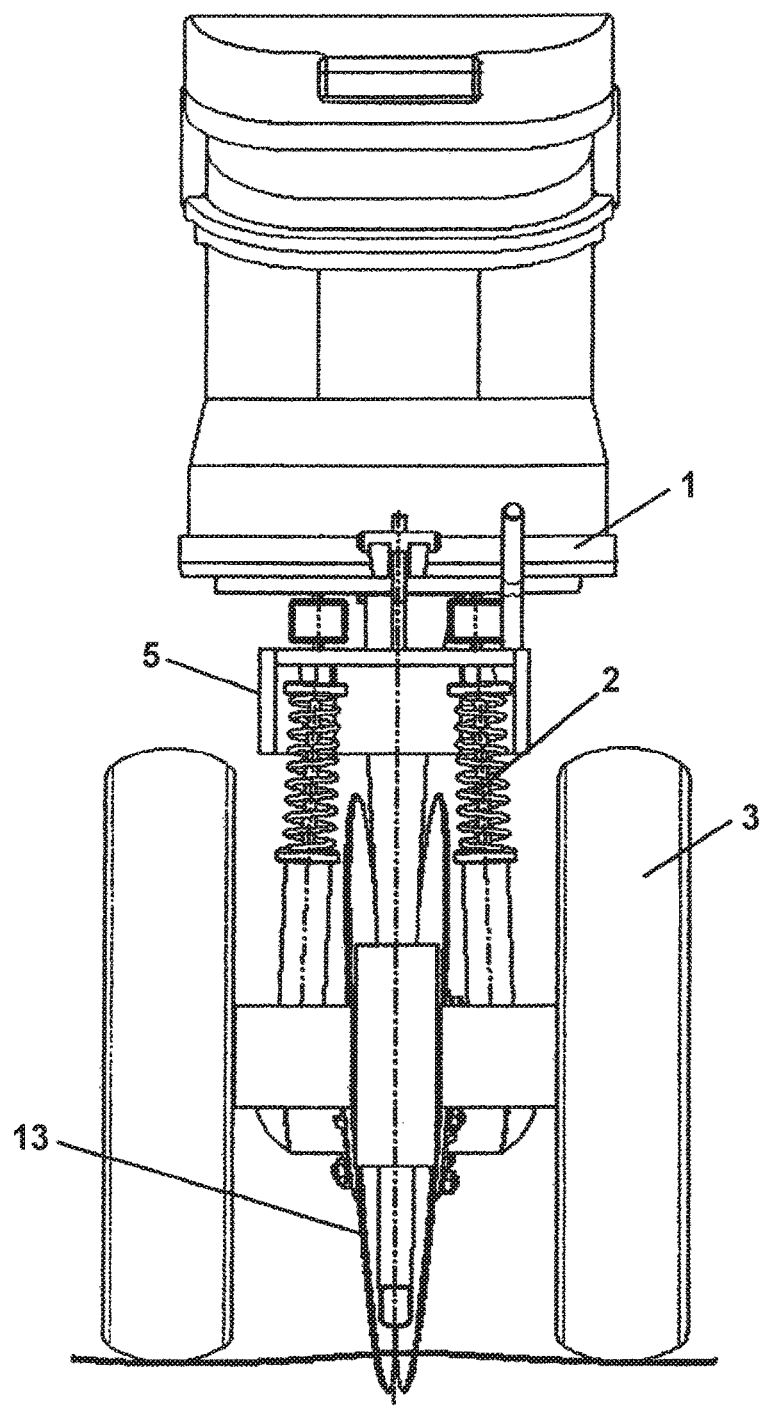
FIG. 4 represents a side view of the planting line with two damper systems, where the depth-limitation wheel, the system damper, the chassis for the seed meter, the seed meter and the disc cutters can all be seen.

FIG. 3 shows the same side view shown in FIG. 2; however, this depicts another damper of the elastomer type between the chassis (5) of the seed meter and the seed meter (1).

FIG. 5 illustrates examples of basic components of the damper system used in the disclosure: a spring (6), a hydraulic piston (7) and an elastomer or cushion pad (4). Any type of damper can be used, such as an electromagnetic one or any one that may be created.

FIG. 6 represents a sample of what occurs with seeds (8) under the effect of bumps and jerks in a planting line of the prior art. The seeds (8) jump from the ring (9) and position themselves in a random way on the seed meter discs (10). This is the case for the honeycomb disc (10) system, the vacuum or finger system or any system that may be created.

FIG. 7 represents a sample of what occurs with seeds (8) under the effect of bumps and jerks in a planting line with the damper system (2, 4). The seeds (8) jump less from the rings (9) and position themselves with more regularity on the seed meter discs (10). This is the case for the honeycomb disc (10) system, the vacuum or finger system or any system that may be created.

FIG. 8 represents a side view of a seed conductor (11) conducting seed (8) under the effects of bumps and jerks on a planting line of the prior art. It is noted that the seeds fall in a more irregular way when compared with FIG. 9.

FIG. 9 represents a side view of a seed conductor (11*a*) directing the seeds (8) under the effect of bumps and jerks on a planting line with the damper system (2, 4) disclosed herein. It is noted that the seeds fall in a more regular way when compared with FIG. 8. In FIG. 9, one can see the details of the grooves (8*a*) in the wall of the conductor that reduces friction with the seeds and improves the distribution of the seeds onto the soil.

Thus, this is the inventive concept defined in the precision seed distribution system that is the object of this disclosure. Its results have been highly satisfactory and unexpected in the planting of seeds. It is also possible to envisage technical alterations to the system without moving away from its core purpose, herein claimed.

The invention claimed is:

1. A seed distribution system applied to a planting machine, the seed distribution system comprising:
    a seed meter for distributing seeds in a furrow;
    a row unit chassis that provides support to the seed meter;
    machine elements that touch the soil and provide support to the row unit chassis;
    a seed conductor connected to and supported by the seed meter; and
    at least one damper system comprising a plurality of dampers positioned directly between the row unit chassis and the seed meter to absorb vibrations from the machine elements that touch the soil and to provide physical support to the seed meter, wherein each of the dampers comprises at least one component selected from the group consisting of a hydraulic piston and spring, an elastomer pad, a cushion pad, or an electromagnetic absorber.

2. The seed distribution system of claim 1, wherein the at least one damper system further comprises another damper positioned between a depth-limiting wheel and the row unit chassis.

3. The seed distribution system of claim 1, wherein each of the dampers of the at least one damper system comprises at least one elastomer pad positioned between the row unit chassis and the seed meter.

4. The seed distribution system of claim 1, wherein each of the dampers of the at least one damper system comprises a hydraulic piston and spring positioned between the row unit chassis and the seed meter.

5. The seed distribution system of claim 1, wherein the seed meter comprises a horizontal disc.

* * * * *